US011767709B2

(12) United States Patent
Brailsford (10) Patent No.: US 11,767,709 B2
(45) Date of Patent: Sep. 26, 2023

(54) FOLDING PATIO PET DOOR

(71) Applicant: Animalistic Pet Products Pty. Ltd., Coolangatta (AU)

(72) Inventor: David Brailsford, Red Hill (AU)

(73) Assignee: Animalistic Pet Products Pty. Ltd., Coolum Beach (AU)

( * ) Notice: Subject to any disclaimer, the term of this patent is extended or adjusted under 35 U.S.C. 154(b) by 0 days.

(21) Appl. No.: 17/540,639

(22) Filed: Dec. 2, 2021

(65) Prior Publication Data

US 2022/0170318 A1     Jun. 2, 2022

(30) Foreign Application Priority Data

Dec. 2, 2020   (AU) ................................ 2020904461
Aug. 19, 2021  (AU) ................................ 2021218130

(51) Int. Cl.
  *E06B 7/32*   (2006.01)
  *E05D 3/12*   (2006.01)
  *A01K 29/00*  (2006.01)

(52) U.S. Cl.
  CPC .............. *E06B 7/32* (2013.01); *E05D 3/12* (2013.01); *A01K 29/00* (2013.01)

(58) Field of Classification Search
  CPC ........ E06B 7/32; E06B 2009/002; E06B 9/04; E06B 9/02; E06B 11/02; E05D 3/12; A01K 29/00
  See application file for complete search history.

(56) References Cited

U.S. PATENT DOCUMENTS

| | | | | |
|---|---|---|---|---|
| 2,850,087 A | * | 9/1958 | Janaman ................ | B60J 1/2011 160/217 |
| 3,226,776 A | * | 1/1966 | Wormer .................... | E06B 7/32 D6/555 |
| 3,324,930 A | * | 6/1967 | Colombo ................ | E06B 3/481 160/183 |
| 3,654,733 A | * | 4/1972 | Blackwell ................ | E06B 7/32 49/67 |
| 3,811,224 A | * | 5/1974 | Garrison .................. | E06B 7/32 160/180 |
| 3,878,645 A | * | 4/1975 | Porter ...................... | E06B 7/32 49/169 |
| 4,444,240 A | * | 4/1984 | Bannister ............ | G09F 15/0068 16/354 |
| 5,048,587 A | * | 9/1991 | York ........................ | E06B 9/52 160/217 |
| 5,062,181 A | * | 11/1991 | Bobrowski ............ | E05D 3/122 16/234 |
| 5,105,868 A | * | 4/1992 | Riise ........................ | E06B 7/32 160/90 |
| 5,185,954 A | * | 2/1993 | Waddle, Sr. ............ | E06B 7/32 49/168 |
| D389,247 S | * | 1/1998 | Norried ...................... | D25/48.3 |
| 5,966,777 A | * | 10/1999 | Jantschek ............ | E04B 2/7431 16/354 |

(Continued)

*Primary Examiner* — Justin B Rephann
(74) *Attorney, Agent, or Firm* — Julie K. Staple; Dinsmore & Shohl LLP (57) ABSTRACT

The present invention relates to a removable pet door. The removable pet door comprising a lower wall section hingedly connected to an upper wall section. The present removable pet door addresses or ameliorates some of the issues encountered by presently available pet doors.

9 Claims, 8 Drawing Sheets

(56) References Cited

U.S. PATENT DOCUMENTS

| | | | | |
|---|---|---|---|---|
| 6,009,930 | A * | 1/2000 | Jantschek | E04B 2/7431 160/352 |
| 6,952,861 | B2 * | 10/2005 | Ynosencio | E05D 3/12 16/382 |
| 7,784,430 | B1 * | 8/2010 | Thorne | E06B 7/32 119/501 |
| 8,074,606 | B1 * | 12/2011 | Schrey | E06B 7/32 119/501 |
| 8,176,962 | B2 * | 5/2012 | Kilfoyle | E06B 7/32 160/180 |
| 8,333,037 | B2 * | 12/2012 | Sullivan | E06B 7/32 160/90 |
| 8,720,011 | B1 * | 5/2014 | Hsu | E05D 3/122 16/354 |
| 10,435,942 | B1 * | 10/2019 | Dunavin | E06B 7/32 |
| 10,961,770 | B1 * | 3/2021 | Fernandez | E06B 9/02 |
| 11,274,491 | B1 * | 3/2022 | Fernandez | E06B 3/54 |
| 2002/0138947 | A1 * | 10/2002 | Jantschek | E04B 2/7431 16/371 |
| 2006/0053693 | A1 * | 3/2006 | Sullivan | E06B 7/32 49/168 |
| 2006/0201638 | A1 * | 9/2006 | Hesketh | E06B 7/32 160/180 |
| 2012/0151716 | A1 * | 6/2012 | Holstensson | E05D 3/12 16/224 |
| 2013/0047517 | A1 * | 2/2013 | Peterson | E06B 7/32 160/184 |
| 2014/0352219 | A1 * | 12/2014 | Zieske | E06B 7/02 49/124 |
| 2014/0367056 | A1 * | 12/2014 | Miller | E05D 3/12 16/221 |
| 2017/0247939 | A1 * | 8/2017 | Carson | E06B 7/32 |
| 2021/0079719 | A1 * | 3/2021 | Vanderbilt-Kay | E06B 7/32 |

* cited by examiner

FOLDING PATIO PET DOOR

REFERENCE TO RELATED APPLICATIONS

This application claims priority to Australian patent application No. 2020904461, filed Dec. 2, 2020 and Australian patent application No. 2021218130, filed Aug. 19, 2021. The entire content of both of which is incorporated herein by reference.

FIELD OF THE INVENTION

The present invention relates to pet doors. Particularly, the present invention relates to pet doors for animals such as dogs and cats. More particularly, the present invention relates to a transportable and/or removable pet door.

BACKGROUND TO THE INVENTION

Any reference to background art herein is not to be construed as an admission that such art constitutes common general knowledge in Australia or elsewhere.

Pet doors are often formed in doors and/or walls of a structure to facilitate a pet to enter or leave the premise without requiring the assistance of an owner. However, an issue often faced by pet owners is that they do not wish to or are unable to install pet doors. In this regard, some pet owners are unable to install pet doors because they are renting and/or unable to make modifications to the structure.

Pets form an integral part of the lives of their owners and may accompany them on holidays. In these circumstances, the holiday homes may not necessarily have pet doors and it is not feasible to carry or install pet doors.

It will would be advantageous to address one or more of the above issues or to at least provide the consumer with a commercial alternative.

SUMMARY OF THE INVENTION

In one aspect, although it need not be the only or indeed the broadest aspect, the invention resides in a removable pet door comprising a lower wall section hingedly connected to an upper wall section.

In one embodiment, the removable pet door further comprises a hinging assembly. In an embodiment, the hinging assembly further comprises a connector hingedly connected to a first wall engaging member. In embodiments, the connector is hingedly connected to a second wall engaging member.

In some embodiments, the connector comprises a first end and the second end. In one embodiment, the first end comprises at least one first prong comprising a first aperture. In certain embodiments, the second end comprises at least one second prong comprising a second aperture.

In some embodiments, the connector comprises an extension extending away from the first prong. In embodiments, the connection comprises a protrusion.

In an embodiment, the first wall engaging member comprises at least one third prong comprising a third aperture. In some embodiments, the first wall engaging member further comprises a stop member.

In embodiments, the second wall engaging member comprises at least one fourth prong comprising a fourth aperture. In one embodiment, the second wall engaging member further comprises an extension member extending from the fourth prong.

In certain embodiment, the lower wall section and/or the upper wall section comprise a cavity or channel to accept the hinging assembly. In some embodiments, the hinging assembly is retractably connected or biased to the upper wall section and/or the lower wall section.

In a second aspect, the invention resides in a method for installing a pet door including: providing a removable pet door comprising a lower wall section hingedly connected to an upper wall section; securing the removable pet door to the door, to thereby install a pet door.

The removable pet door is as substantially described herein for the first aspect.

In one embodiment, the door is a sliding door.

The various features and embodiments of the present invention referred to in the individual sections above and in the description which follows apply, as appropriate, to other sections, mutatis mutandis. Consequently, features specified in one section may be combined with features specified in other sections as appropriate.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Embodiments of the present invention reside primarily in a transportable and/or removable pet door. Accordingly, the assembly and method steps have been illustrated in concise schematic form in the drawings, showing only those specific details that are necessary for understanding the embodiments of the present invention, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order.

Words such as "comprises" or "includes" are intended to define a non-exclusive inclusion, such that an assembly, method, article, or apparatus that comprises a list of elements does not include only those elements but may include other elements not expressly listed, including elements that are inherent to such an assembly, method, article, or apparatus.

As used herein, the term 'about' means the amount is nominally the number following the term 'about' but the actual amount may vary from this precise number to an unimportant degree.

The present invention is predicated on the finding that a removable pet door can be easily installed. In this regard, alterations to the existing structure are not required and the removable pet door is easily transportable and installable. The removable pet door alleviates one or more of the issues mentioned hereinabove.

In one aspect, although it need not be the only or indeed the broadest aspect, the invention resides in a removable pet door comprising a lower wall section hingedly connected to an upper wall section.

Figure 1:
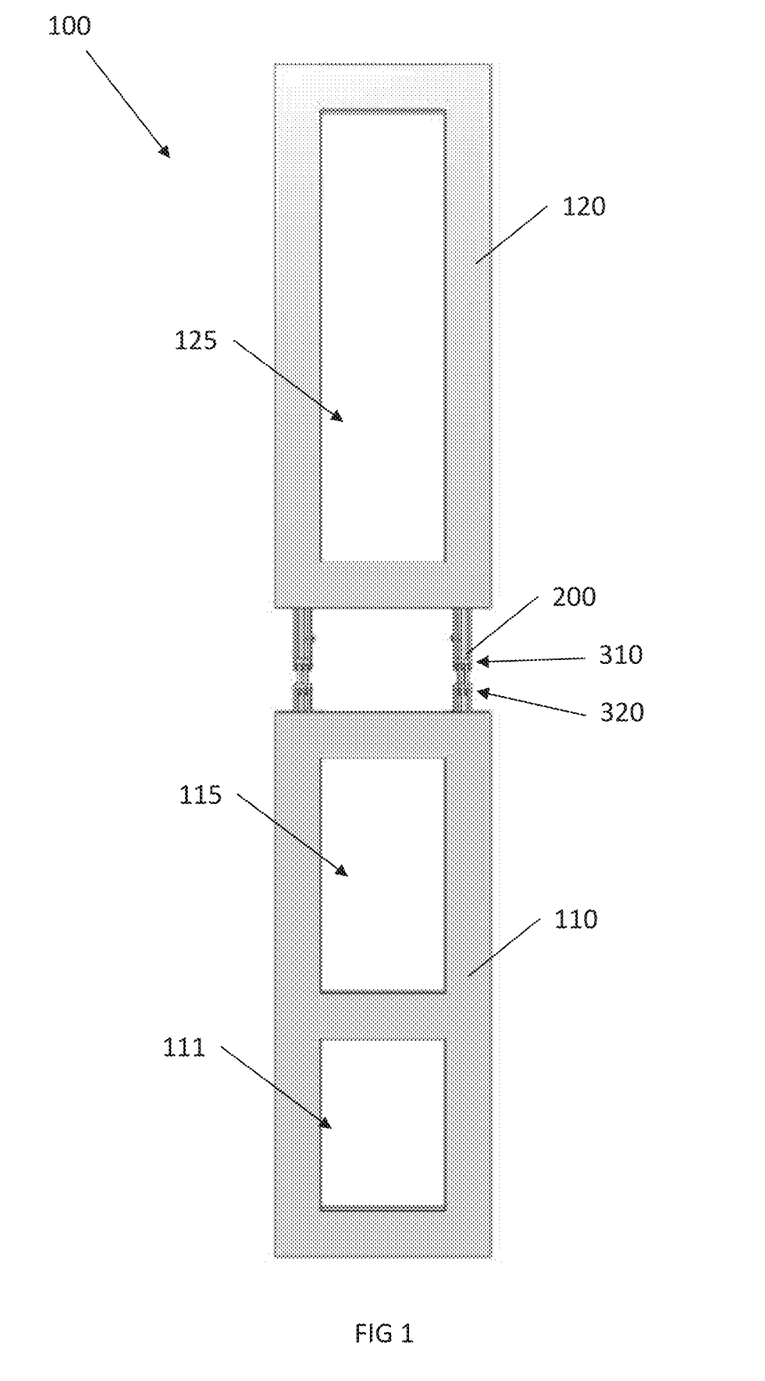
FIG. 1 shows an embodiment of the present pet door.

Referring to FIG. 1 is shown an embodiment of the present transportable and/or removable pet door. The pet door 100 is suitably used in conjunction with door tracks. In particular, the pet door 100 is suitably used in conjunction with sliding door tracks. In this regard, the upper and lower extents of the pet door 100 are suitably provided with engagement portions that engage the door tracks and assist in securing the pet door in place. The side portions of the upper and lower extents are suitably provided with further engagement portions adapted to engage the side of the door opening.

The pet door 100 comprises a lower wall section 110 and an upper wall section 120. The lower section 110 is hingedly connected to the upper wall section 120. In the embodiment shown, a hinging assembly 200 connects the lower wall section 110 to the upper wall section 120.

The lower wall section 110 suitably comprises an opening 111 that facilitates the entry or exit of a pet. The lower wall section 110 may also suitably comprise a window 115. In one embodiment, the window is suitably openable. However, it will be appreciated that the window is not essential to the invention. In this regard, the window 115 may be replaced with mesh to allow air flow therethrough. Alternatively, the lower wall section 110 is complete (except with the provision of the opening). In one embodiment, the opening 111 suitably comprises a flap.

In the embodiment shown, the upper wall section 120 suitably comprises one or more windows 125. In one embodiment, the window is suitably openable. However, it will be appreciated that the window is not essential to the invention. In this regard, the window 125 may be replaced with mesh to allow air flow therethrough. Alternatively, the upper wall section 120 is complete and does not comprise an opening.

Figure 2:
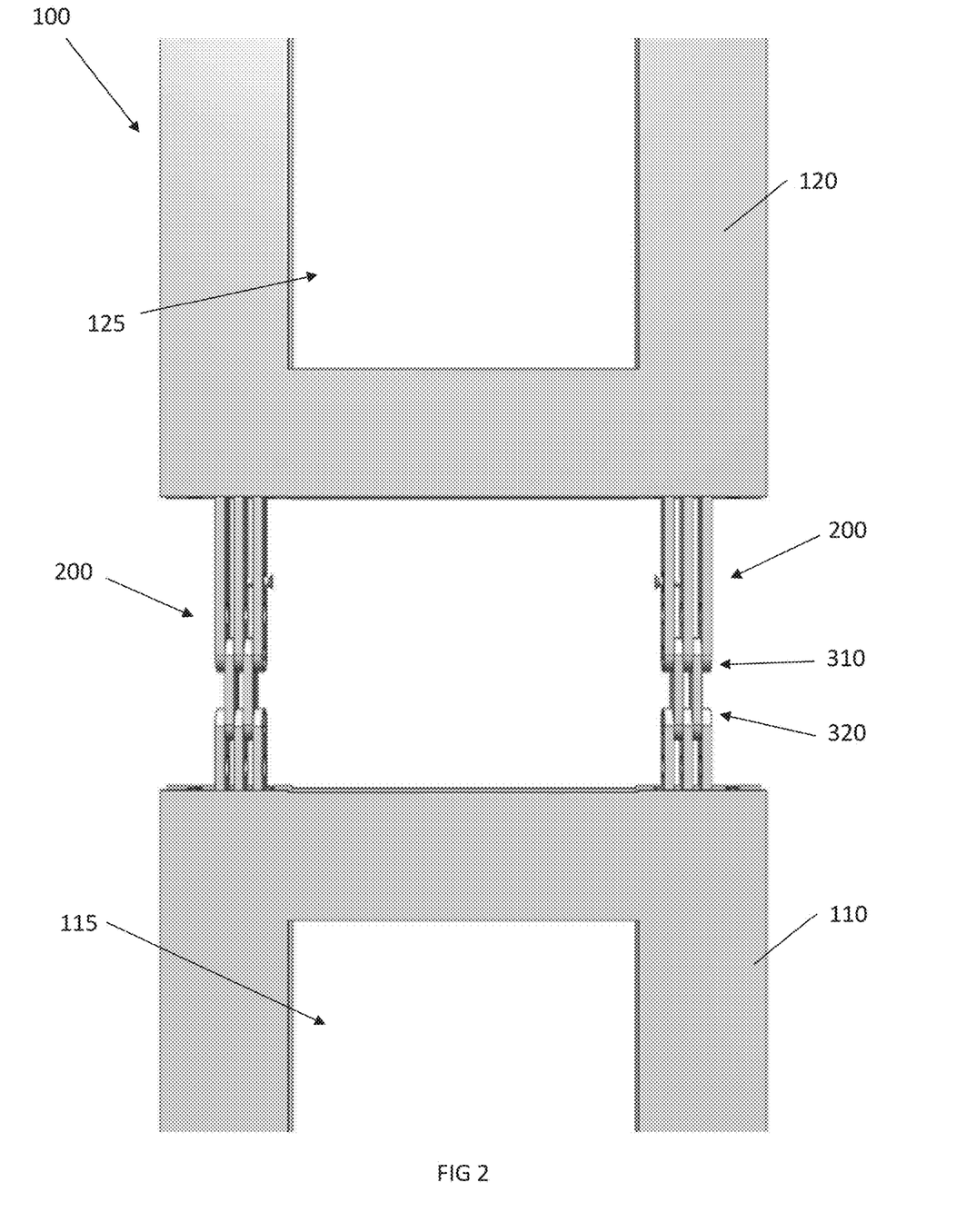
FIG. 2 shows an enlarged view of the hinging mechanism and the wall sections.
Figure 3:
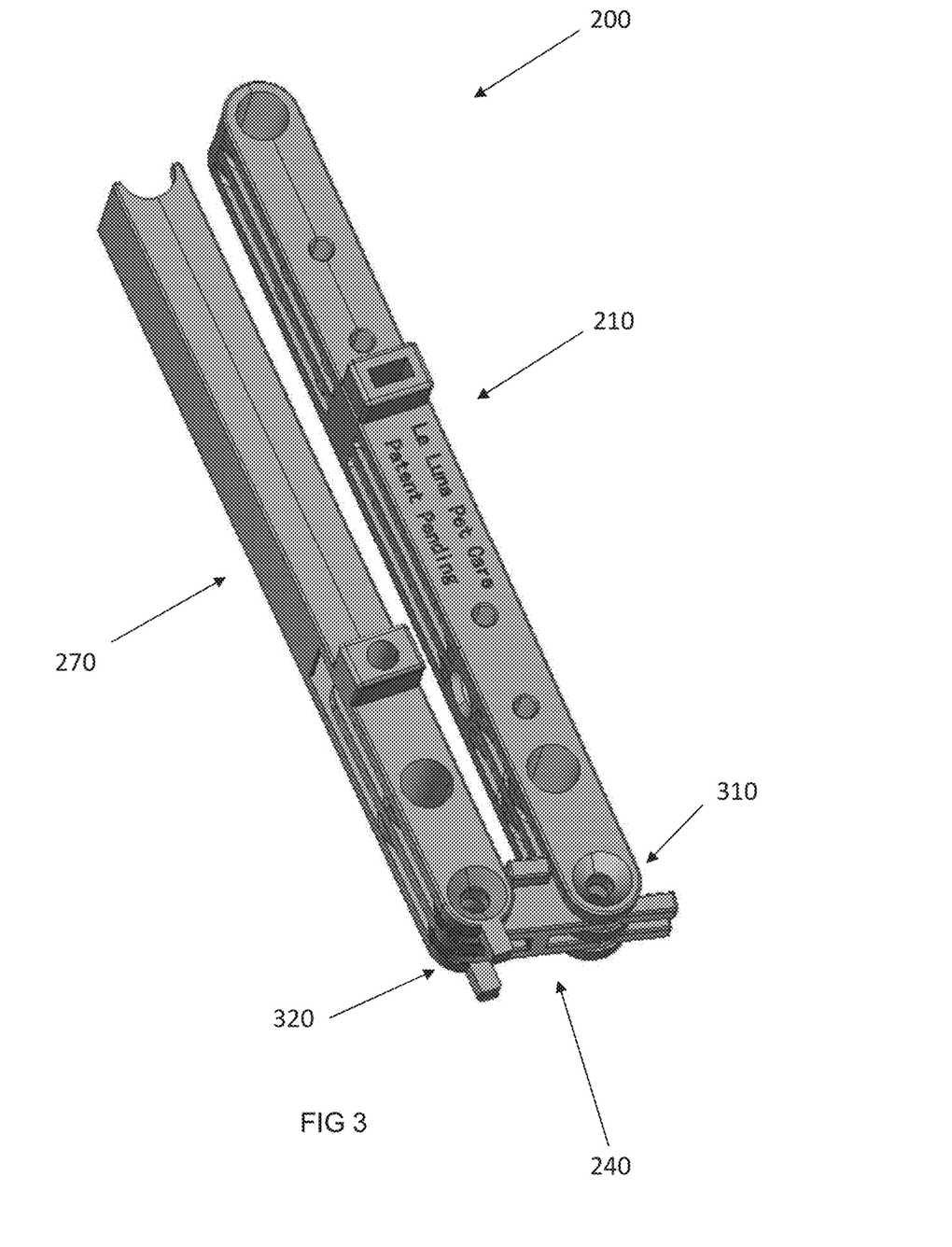
FIG. 3 shows an embodiment of the hinging assembly.

FIG. 2 shows an enlarged view of the hinging assembly 200 and FIG. 3 shows the hinging assembly 200 in the absence of the lower wall section 110 and the upper wall section 120. The hinge assembly 200 in FIG. 3 is shown in the storage configuration (folded configuration). The hinging assembly 200 comprises a first wall engaging member 210 adapted to engage either the upper wall section 120 or the lower wall section 110, a second wall engaging member 270 adapted to engage the other of the upper wall section 120 or the lower wall section 110, and a connector 240 hingedly connected to the first wall engaging member 210 and also hingedly connected to the second wall engaging member 270. The connector 240 is suitably connected to first wall engaging member 210 at an end thereof. The connector 240 is suitable connected to the second wall engaging member 270 at another end thereof.

Figure 4:
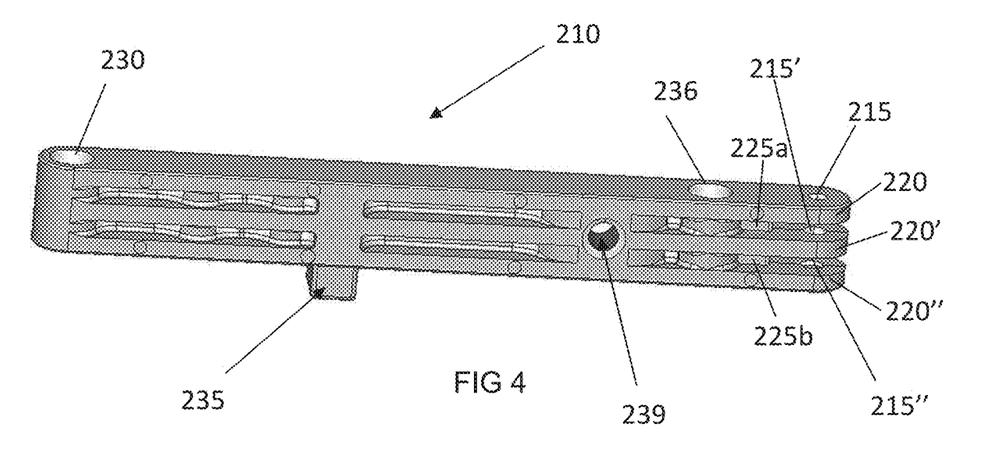
FIG. 4 shows an embodiment of the first wall engaging member.

Shown in FIG. 4 is an embodiment of the first wall engaging member 210. The first wall engaging member 210 comprises a first attachment portion that is adapted to hingedly connect to the connector 240. The first attachment portion is suitably located at an end of the first wall engaging member 210. In the embodiment shown in FIG. 4, the first attachment portion comprise one or more apertures 215, 215', 215". In this embodiment, the first attachment portion comprises aligned apertures 215, 215', 215" in three third prongs 220, 220', 220" extended from the end. In the embodiment shown, the third prongs 220, 220', 220" are arcuate in shape to facilitate rotation thereof. The first wall engaging member 210 may further comprise a stop member 225a, 225b that extends between third prongs 220, 220' and 220', 220".

The first wall engaging member 210 further comprises a second attachment portion. The second attachment portion may be located at end 230 of first engaging member 210. The second attachment portion is suitably adapted to secure to the first wall engaging member 210 to either the upper wall section 120 or the lower wall section 110. In this regard, the upper wall section 120 and/or the lower wall section 110 may comprise a second complementary attachment portion that is complementary to the second attachment portion. In one embodiment, the second attachment portion 230 is adapted to secure, affix and/or attach to the upper wall section 120.

Figure 7:
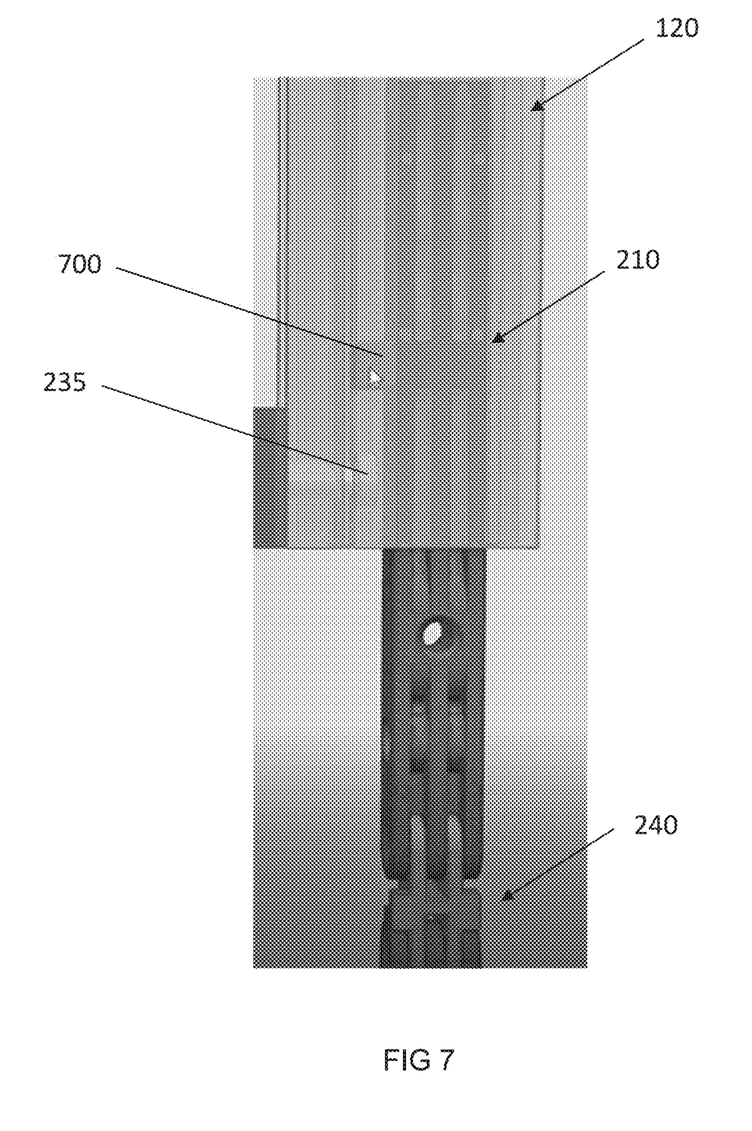
FIG. 7 shows an embodiment of the first wall engagement member engaging a partially transparent upper wall section.

Referring to FIG. 7, a close up of the first wall engaging member 210 is shown engaging the upper wall section 120. In the embodiment shown, the first wall engaging member 210 comprises a protrusion 235. The protrusion 235 extends perpendicularly to the longitudinal axis of the first wall engaging member 210. In this regard, the first wall engaging member 210 may be received by a channel of cavity in the upper wall section 120. The channel is sized and dimensioned such that it allows the first wall engaging member 210 therein. A screw or similar device (such as bolt 700) may be drilled into the upper wall engaging section 120 through aligned apertures 236. This allows for the head of the screw or similar device to protrude into the inner volume of the cavity or channel. As the protrusion 235 has already been inserted in, the first wall engaging member 210 is unable uncouple from the upper wall section 120 because the protrusion 235 abuts the head of the screw or similar device (such as a bolt 700). The bolt 700 engages the protrusion 235 and prevents the first wall engaging member 210 from disengaging the upper wall section 120.

Figure 5:
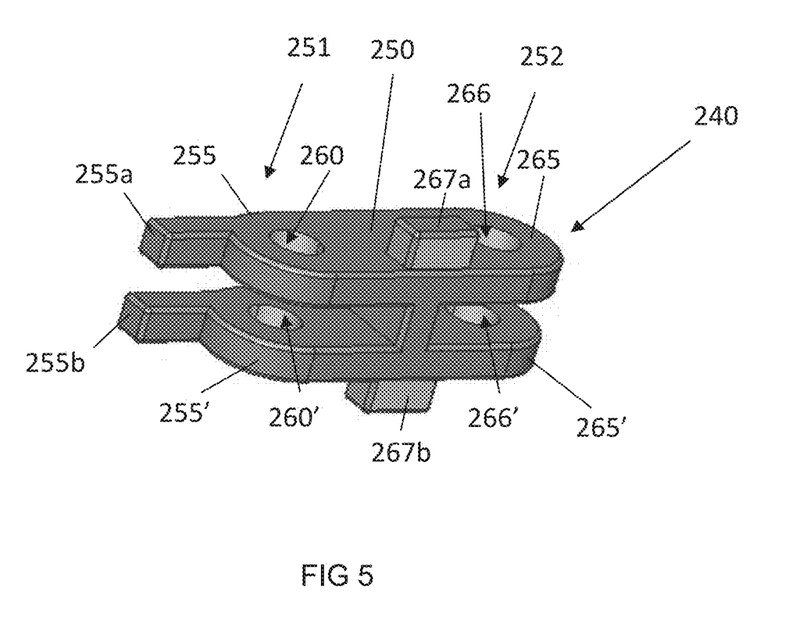
FIG. 5 shows an embodiment of the connector.

Shown in FIG. 5 is an enlarged view of an embodiment of the connector 240. As mentioned hereinabove, the connector 240 is adapted to hingedly connect to the first wall engaging member 210. The connector comprises a body 250 comprising a first end 251 and a second end 252. The body comprises a pair of first prongs 255, 255'. The prongs 255, 255' extend from the first end 251. Each first prong 255, 255' is adapted to fit between the third prongs 220, 220', 220" of the first wall engaging member 210. The pair of first prongs 255, 255' each comprise an aperture 260, 260', respectively. The apertures 260, 260' are aligned. In use, the first prongs 255, 255' are located between the third prongs 220, 220', 220" and the apertures 215, 215', 215, 260, 260' are aligned. A rod can then be inserted through the apertures such that the connector 240 and the first wall engaging member 210 are hingedly connected. That is, the first wall engaging member 210 can be rotated relative to the connector 240.

It will be appreciated that the junction of the first wall engaging member 210 and the connector 240 forms a first hinge mechanism 310.

In the embodiment shown, the first prongs 255, 255' are arcuate in shape. The first prongs 255, 255' suitably further comprise an extension 255a, 255b extending therefrom, respectively. An extension extends from an end of the respective prong. In one embodiment, the extension 255an 255b extends from the same side of the connector 240. During the hinge movement of the connector 240 relative to the first wall engaging member 210, the hinged movement is prevented from proceeding beyond about 180° by virtue of the extension 255a, 255b engaging the stop member 225a, 225b. The extensions 255a, 255b are substantially in the same plane as the prongs 255, 255'. This advantageously prevents the movement beyond the substantially planar position. Additionally, orientation of the pet door is able to provide a further deterrent to the pet door being broken in. In this regard, the pet door can be orientation such that the pet door folds inwardly, such that force (such a kick) from the outside will be met with more resistance. This provides further structural integrity to the pet door.

The body 250 further comprises a further pair of second prongs 265, 265' extending from the second end 252. The pair of second prongs 265, 265' each comprise an aperture 266, 266'. The apertures 136b, 136b' are aligned. The second prongs 265, 265' are arcuate in shape. The body 250 further comprises a pair of protrusions 267a, 267b extending substantially perpendicularly to the second prongs 265, 265'. In one embodiment, the protrusions 267a, 267b are outwardly facing.

Figure 6:
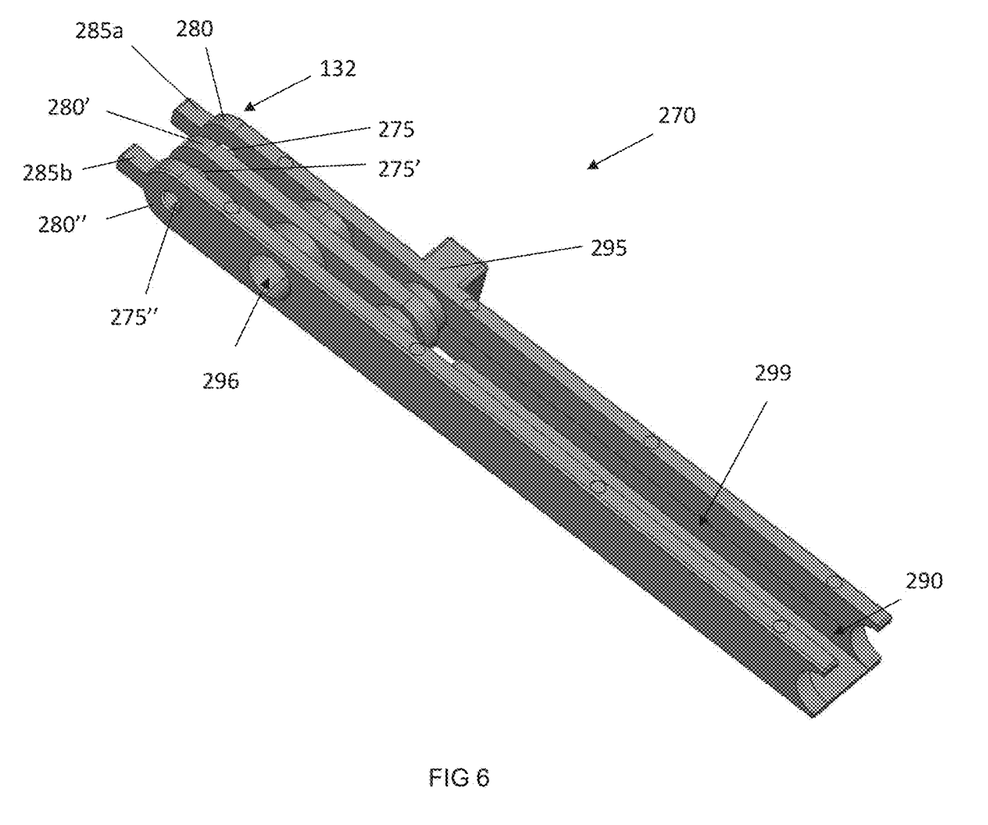
FIG. 6 shows an embodiment of the second wall engaging member.

Shown in FIG. 6 is an embodiment of second wall engaging member 270. The second wall engaging member 270 comprises an attachment portion that is adapted to hingedly connect to the connector 240. The attachment portion is suitably located at an end of the second wall engaging member 270. In the embodiment shown in FIG. 6, the attachment portion comprises one or more apertures. In this embodiment, the first attachment portion comprises aligned apertures 275, 275', 275" in a respective fourth prongs 280, 280', 280" extended from the end. In the embodiment shown, the fourth prongs 280, 280', 280" are arcuate in shape. The fourth prongs 265, 265' of the connector 240 are adapted to be located between fourth prongs 280, 280', 280" such that the apertures are aligned. A rod can then be inserted through the apertures such that the connector 240 and the second wall engaging member 270 are hingedly connected. That is, the second wall engaging member 270 can be rotated relative to the connector 240.

It will be appreciated that the junction of the second wall engaging member 270 and the connector 240 forms a second hinge mechanism 320. In one embodiment, the pet door 100 comprises a first hinge mechanism 310 and a second hinge mechanism 320.

The second wall engaging member 270 may further comprise second extension members 285a, 285b. The second extension members 285a, 285b are located on the outer prongs 280, 280". In one embodiment, the second extension members 285a, 285b are centrally located on their respective fourth prong 280, 280".

In one embodiment, the second wall engaging member 270 may further comprises a third attachment portion. The third attachment portion may be provided at end 290. The third attachment portion is adapted to secure to the second wall engaging member 270 to either the upper wall section 120 or the lower wall section 110. In this regard, the upper wall section 120 and/or the lower wall section 110 comprise a third complementary attachment portion that is complementary to the third attachment portion 290. In one embodiment, the third attachment portion 290 is adapted to secure to the lower wall section 110.

Figure 8:
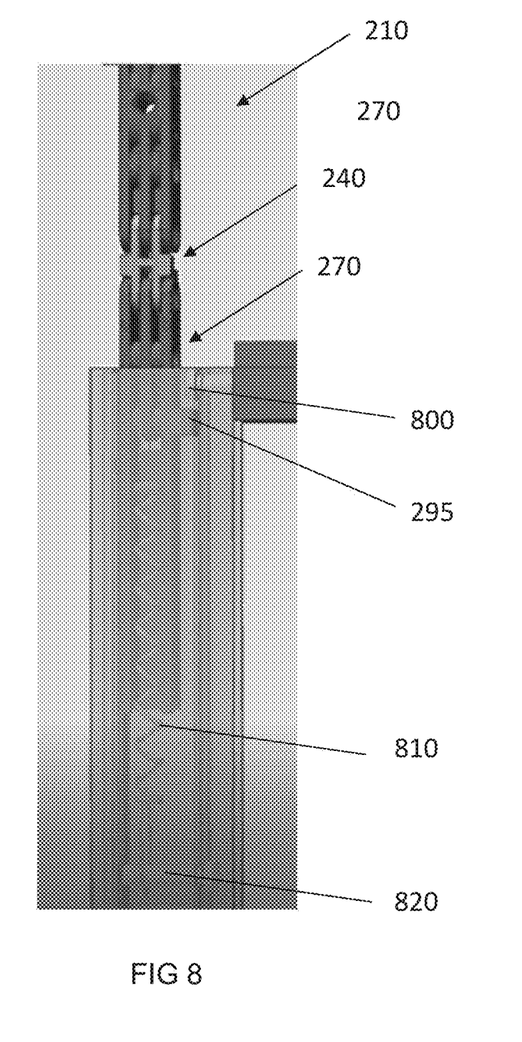
FIG. 8 shows an embodiment of the second wall engagement member engaging a partially transparent lower wall section.

Shown in FIG. 8 is an embodiment of the second wall engaging member 270 attached to a lower wall section 110. The lower wall section 110 is show as slightly transparent to show the mechanism therein. The second wall engaging member 270 further comprises a second protrusions 295 extending therefrom. The second protrusion 295 extends perpendicularly to the longitudinal axis of the second wall engaging member.

The second wall engaging member 270 may be received by a channel of cavity in the lower wall section 110. The channel is sized and dimensioned such that it allows the second wall engaging member 270 therein. A screw or similar device (such as bolt 800) may be drilled into the upper wall engaging section 120 through aligned apertures 296. This allows for the head of the screw or similar device to protrude into the inner volume of the cavity or channel. As the protrusion 295 has already been inserted in, the second wall engaging member 270 is unable uncouple from the lower wall section 110 because the protrusion 295 abuts the head of the screw or similar device (such as a bolt 800). The bolt 800 engages the protrusion 295 and prevents the first wall engaging member 270 from disengaging the lower wall section 110.

During the hinged movement of the second wall engaging member 270 relative to the connector 240, the hinged movement is prevent from proceeding beyond about 180° C. by virtue of the second extension member 285a, 285b engaging the protrusions 267a, 267b. As mentioned above, this advantageously prevents the movement beyond the substantially planar position. Additionally, orientation of the pet door is able to provide a further deterrent to the pet door being broken in. In this regard, the pet door can be orientation such that the pet door folds inwardly, such that force (such a kick) from the outside will be met with more resistance. This provides further structural integrity to the pet door.

Figure 9:
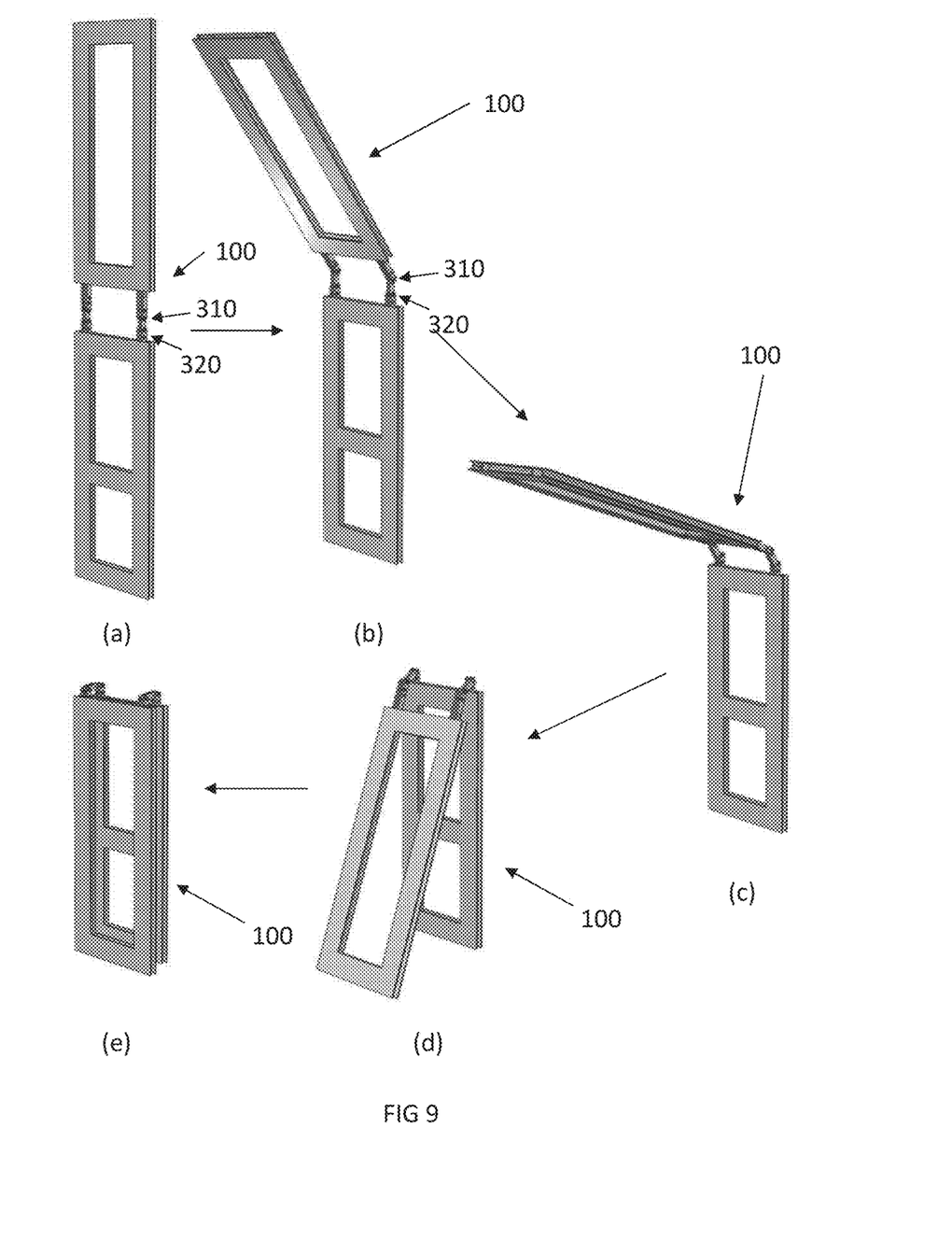
FIG. 9 shows an embodiment of the pet door transitioning from an in use configuration (FIG. 9a) to a storage configuration (FIG. 9e).

The pet door 100 comprises two hinged connections which allows the pet door 100 to move from an in use configuration (FIG. 9a) to a storage configuration (FIG. 9e). The two hinged connections allows the upper wall section 120 to fold onto the lower wall section 110. This advantageously allows for easy storage and transport of the pet door 100.

Shown in FIG. 9 are a series of figures which depict the pet door 100 transitioning from an in use configuration (FIG. 9a) to a storage configuration (FIG. 9e). Shown in FIG. 9a is the pet door 100 in the in use configuration. In order to change configuration from the in-use configuration to the storage configuration, the hinge mechanisms are rotated. Shown in FIG. 9b, the first hinge mechanism 310 is first folded. Shown in FIG. 9c, the second hinge mechanism 320 is then folded. Shown in FIG. 9d, the first hinge mechanism 310 is further folded to about 90°. Finally, the second hinge mechanism 320 is further folded to about 90° such that the plane of the upper wall section 120 is substantially parallel to the plane of the lower wall section 110. As shown, the lower wall section 110 suitably engages the upper wall section 120 to provide a space efficient storage configuration. It will be appreciated that the order of rotation is not limited to the above sequence of steps.

In one embodiment, the first wall engaging member 210 and/or the second wall engaging member 270 is retractably connected to the respective upper wall section 120 or lower wall section 110. In this regard, the first wall engaging member 210 may be connected to the respective upper wall section 120 or lower wall section 110 such that it is biased towards the respective wall section. The first wall engaging member 210 may be biased such that it is pulled into a cavity adapted to receive the first wall engaging member 210. In one embodiment, the lower wall section 110 comprises a cavity. In an embodiment, the upper wall section 120 comprises a cavity. In another embodiment, the second wall engaging member 210 may be connected to the respective upper wall section 120 or lower wall section 110 such that is biased towards the respective wall section.

Referring to FIG. 8, a spring 810 is utilized to bias the wall engaging member into a respective wall section. The spring 810 is suitably connected to anchor in the cavity or channel of the lower wall section 110. In the embodiment shown, the spring 810 is suitably connected to a bolt 820 extending across the cavity or channel. The second wall engaging member is provided with groove 299 which can accommodate the spring 810. In use, the spring 810 is connected to the bolt 820 at an end thereof and connected to the second wall engaging member at the other end thereof. In the embodiment shown, the spring 810 is connected to securement portion of the second wall engaging member. The second wall engaging member 270 is also provided with an arcuate indentation at end 290. The arcuate indentation suitably engages the bolt when retracted.

This biasing mechanism suitably biases the upper wall section 120 towards the lower wall section 110, and the hinge mechanism is hidden away from view. To provide further structural support, the lower extent of the upper wall section 120 may be provided with a cavity which accepts a protrusion from extension from the upper extend of the lower wall section 110. In this regard, as the biasing mechanism biases the upper wall section 120 towards the lower wall section 110, the cavity of the lower extent of the upper wall section 120 receives the extension of the on the upper extent of the lower wall section 110. This provides further structural stability and support to the overall installed pet door.

In an embodiment, the first wall engaging portion 210 is securely attached to the upper wall section 120 and the second wall engaging portion 270 is biased towards a cavity of the lower wall section 120. In use, as the pet door 100 is configured into the in use configuration, the upper wall section 120 is pulled towards the lower wall section 110. In this regard, the second wall engaging portion 270 and connector 240 are pulled into the cavity of the lower wall section 120. Preferably, the upper wall section 120 engages the lower wall section 110.

In one embodiment, the pet door 100 may be locked in the in use configuration. In this regard, the first wall engage member 210 is provided with a locking aperture 239. In one embodiment, the locking aperture 239 comprises a female thread. The lower wall section 110 suitably comprises an aligned aperture (not shown). In use, when the hinging assembly 200 is retracted into the cavity or channel of the lower wall section 110, a fixing member (e.g., a screw, such as a thumb screw) may be inserted to fix the hinging assembly 200 in the in use and retracted position. This provides a further deterrent to the pet door transitioning from the in use configuration to the storage configuration.

Advantageously, this retraction of the hinge mechanisms 310, 320 into the cavity of the lower wall section 120 provides a further deterrent to force compromising the structure of the pet door. In this regard, force outside will be met with more resistance because the hinge mechanism is in a cavity and less likely to fold because of being surrounded by material. This provides further structural integrity to the pet door.

In a second aspect, the invention resides in a method for installing a pet door including: providing a removable pet door comprising a lower wall section hingedly connected to an upper wall section; securing the removable pet door to the door, to thereby install a pet door.

The removable pet door may be as substantially described hereinabove.

In one embodiment, the method further includes the step of converting the pet door from a storage configuration to an in-use configuration.

The present invention allows for a pet door to be installed relatively easily. In this regard, the present pet door has all the components assembled and so a consumer does not need to keep nuts and bolts and the like. This not only makes it much easier to install, but also alleviates the problem of losing screws, nuts and/or bolts that are required for installation.

It will be appreciated that the present invention has been described with three prongs on the first wall engaging member, two pairs of prongs on the connector, and three prongs on the second wall engaging member; however, the person skilled in the art will be able to work the invention with any number of prongs.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A removable pet door comprising a lower wall section hingedly connected to an upper wall section by a hinging assembly,
    wherein the hinging assembly comprises:
    a first wall engaging member engaging either the lower wall section or the upper wall section,
    a second wall engaging member adapted to engage an other of the lower wall section or the upper wall section to which the first wall engaging member is engaged, and
    a connector hingedly connected to the first wall engaging member and hingedly connected to the second wall engaging member,
    wherein the first wall engaging member and/or second wall engaging member is retractably connected and biased into a cavity in the lower wall section or the upper wall such that, in use, the hinging assembly is received entirely in the lower wall section and upper wall section.

2. The removable pet door of claim 1, wherein the connector comprises a first end and a second end, wherein the first end comprises at least one first prong comprising a first aperture, and wherein the second end comprises at least one second prong comprising a second aperture.

3. The removable pet door of claim 2, wherein the connector comprises an extension extending away from the first prong.

4. The removable pet door of claim 2, wherein the connector comprises a protrusion.

5. The removable pet door of claim 1, wherein the first wall engaging member comprises at least one third prong comprising a third aperture.

6. The removable pet door of claim 5, wherein the first wall engaging member further comprises a stop member.

7. The removable pet door of claim 6, wherein the second wall engaging member further comprises an extension member extending from the fourth prong.

8. The removable pet door of claim 1, wherein the second wall engaging member comprises at least one fourth prong comprising a fourth aperture.

9. A method for installing a removable pet door including:
providing the removable pet door of claim 1; and
securing the removable pet door to the door, to thereby install the removable pet door.

\* \* \* \* \*